US012534007B2

(12) United States Patent
Yu et al.

(10) Patent No.: US 12,534,007 B2
(45) Date of Patent: Jan. 27, 2026

(54) DEVICE FOR ADJUSTING POSITION OF VEHICLE HEADREST

(71) Applicants: Kia Corporation, Seoul (KR); Hyundai Motor Company, Seoul (KR); SEOYONCNF, Ulsan (KR); HYUNDAI TRANSYS INC., Seosan-si (KR)

(72) Inventors: Sang Uk Yu, Seoul (KR); Sang Ho Kim, Incheon (KR); Seung Young Lee, Seoul (KR); Tae Hoon Lee, Suwon-si (KR); Jun Namgoong, Asan-si (KR); Yong Jun Shin, Ulsan (KR); Won Kee Kim, Hwaseong-si (KR); Hyun Kim, Hwaseong-si (KR); Jun Ho Lee, Yongin-si (KR)

(73) Assignees: Hyundai Motor Company, Seoul (KR); Kia Corporation, Seoul (KR); SEOYONCF, Ulsan (KR); HYUNDAI TRANSYS INC., Seosan-si (KR)

( * ) Notice: Subject to any disclaimer, the term of this patent is extended or adjusted under 35 U.S.C. 154(b) by 127 days.

(21) Appl. No.: 18/613,423

(22) Filed: Mar. 22, 2024

(65) Prior Publication Data
US 2025/0170938 A1    May 29, 2025

(30) Foreign Application Priority Data
Nov. 28, 2023   (KR) .................. 10-2023-0168119

(51) Int. Cl.
*B60N 2/865*   (2018.01)
*B60N 2/829*   (2018.01)

(52) U.S. Cl.
CPC ............ *B60N 2/865* (2018.02); *B60N 2/829* (2018.02)

(58) Field of Classification Search
CPC ......... B60N 2/809; B60N 2/806; B60N 2/829
See application file for complete search history.

(56) References Cited

U.S. PATENT DOCUMENTS

| | | | |
|---|---|---|---|
| 8,616,633 B2 * | 12/2013 | Truckenbrodt | B60N 2/865 297/216.12 |
| 8,632,125 B2 * | 1/2014 | Yamaguchi | B60N 2/0273 297/216.12 |
| 10,160,361 B2 * | 12/2018 | Little | B60N 2/02246 |
| 2023/0137430 A1 * | 5/2023 | Schukalski | B60N 2/862 297/410 |

FOREIGN PATENT DOCUMENTS

KR    20220146648 A    11/2022

* cited by examiner

*Primary Examiner* — Tye William Abell
(74) *Attorney, Agent, or Firm* — Slater Matsil, LLP (57) ABSTRACT

In an embodiment a headrest position adjustment apparatus includes a fixing frame having a guide plate including a first slide hole at an upper end portion and a second slide hole at a lower end portion, wherein a rear surface portion of the fixing frame is configured to be mounted to a high-back board, a first motor mounted on the fixing frame, wherein the first motor is configured to move a headrest, a fixing guide mounted on the fixing frame, wherein the fixing guide has a pair of first guide pipes facing forward, a first slide including upper guide holes arranged on an upper position on opposite sides of the first slider and lower guide holes arranged on a lower position of the opposite sides of the first slider and into which the first guide pipes are inserted, and a second slider mounted on the headrest.

18 Claims, 8 Drawing Sheets

DEVICE FOR ADJUSTING POSITION OF VEHICLE HEADREST

CROSS-REFERENCE TO RELATED APPLICATIONS

The present application claims priority to Korean Patent Application No. 10-2023-0168119, filed Nov. 28, 2023, the entire contents of which are incorporated herein for all purposes by this reference.

TECHNICAL FIELD

The present disclosure relates to a headrest position adjustment apparatus for a vehicle. More particularly, the present disclosure relates to a headrest position adjustment apparatus for a vehicle, the apparatus being configured such that a position of a headrest in front and rear directions and up and down directions is capable of being conveniently adjusted, the headrest being mounted on a high-back board of a seatback.

BACKGROUND

Generally, a seat for a vehicle includes a seat cushion that supports the lower body of a passenger, a seatback that supports the back and the waist of the passenger, a headrest that supports the neck and the head portion of the passenger, and so on.

When the occipital region is not fully supported on the headrest according to the physical condition of the passenger, there are problems that the passenger feels discomfort and a risk of injury in a collision accident may be increased.

In order to solve the problems, various forward-backward driving mechanisms for adjusting front and rear positions of the headrest and various vertical driving mechanisms for adjusting up and down positions of the headrest according to the position of the passenger's head are applied.

The forward-backward driving mechanism and the vertical driving mechanism of the headrest are required to be designed and manufactured in consideration of the seat design of the vehicle.

For example, in the configuration of the vehicle seat, a high-back board that is arranged higher than a height of the seatback is mounted on a rear surface portion of the seatback so as to increase aesthetic appearance of the seat and so on, and the headrest may be mounted on a front surface portion of the high-back board.

Therefore, a new type of forward-backward driving mechanism and a new type of vertical driving mechanism for adjusting a position of the headrest mounted on the high-back board in the front and rear directions or the vertical direction are required.

SUMMARY

Embodiments provide a headrest position adjustment apparatus for a seat in a vehicle. This apparatus has a new type of forward and backward driving mechanism having levers arranged in an "X" shape and configured to adjust a forward and backward position of the headrest and an upward and downward driving mechanism configured to adjust an upward and downward position of the headrest.

Further embodiments provide a headrest position adjustment apparatus for a seat in a vehicle. This headrest position adjustment apparatus includes a housing mounted on a front surface portion of a high-back board; a headrest mounted on the housing such that the headrest is capable of being slidably moved forward and backward; a fixing frame having a structure in which a guide plate having a slide hole is formed on an upper end portion and a lower end portion of the fixing frame, the fixing frame being mounted inside the housing; a first motor mounted on the fixing frame, the first motor having a first lead screw facing forward as an output shaft; a fixing guide mounted on the fixing frame, the fixing guide having a pair of first guide pipes facing forward; a first slider having an arm screw hole into which the first lead screw is inserted such that the first lead screw is capable of being rotated and which is formed in a predetermined position in the first slider, the first slider having upper guide holes formed on an upper position of opposite sides of the first slider, and the first slider having lower guide holes which is formed on a lower position of the opposite sides of the first slider and into which the first guide pipes are inserted; a second slider mounted on the headrest, the second slider having a pair of second guide pipes facing backward such that the second guide pipes are inserted into the upper guide holes; and a link device connected between the fixing frame and the second slider, the link device being configured to push the second slider forward or to pull the second slider backward.

The link device may include a pair of rear links respectively hinge-mounted on an upper surface portion and a lower surface portion of each guide plate of the fixing frame; a pair of front links respectively hinge-mounted on an upper surface portion and a lower surface portion of the second slider; and a first lever and a second lever having front end portions hinge-fastened to the front links and having rear end portions hinge-fastened to the rear links such that the first lever and the second lever are arranged in an "X" shape.

In addition, the link device further may include a guide pin inserted into the slide hole of the guide plate from an intersection point of the first lever and the second lever such that the guide pin is capable of being moved forward and backward, and then the guide pin may be inserted into and fixed to an upper surface portion of the first slider.

In addition, a fixing groove where a lower end portion of the guide pin which is inserted from the intersection point of the first lever and the second lever and which passes through the slide hole is inserted thereinto and fixed thereto may be formed on the upper surface portion of the first slider.

Preferably, respective auxiliary guide holes where each front end portion of the first guide pipes of the fixing guide passes through the respective guide holes and are inserted thereinto may be formed on a lower position of opposite sides of the second slider.

Preferably, an interference avoidance hole where a front end portion of the first lead screw of the first motor passes through and is inserted thereinto may be formed in a predetermined position in the second slider.

In addition, respective mounting ends mounted on the headrest may be formed integrally with four corner positions of the second slider.

A connection bracket connected to a headrest height adjustment apparatus that is mounted inside the high-back board may be mounted on a rear surface portion of the fixing frame.

The headrest height adjustment apparatus may include: a fixing bracket mounted inside the high-back board; a pair of third guide pipes connected between an upper portion and a lower portion of the fixing bracket; a lifting plate fastened to the connection bracket and also fastened to the third guide pipes such that the lifting plate is capable of being lifted; and a second motor mounted on a rear surface portion of the fixing bracket so as to drive the lifting plate.

In addition, an arm screw body may be formed on a rear surface portion of the lifting plate, and a second lead screw fastened to the arm screw body may be mounted on an output portion of the second motor such that the second lead screw faces upward.

Preferably, a lifting guide hole for securing a lifting space of the connection bracket may be formed through the fixing bracket.

According to the above configurations, the present disclosure may have the following effects.

First, since the electric forward and backward driving mechanism having the levers arranged in the "X" shape and configured to adjust the forward and backward position of the headrest is mounted across the high-back board mounted on the rear surface portion of the seatback and across the inside of the housing mounted on the front surface portion of the high-back board, the forward and backward adjustment of the position of the headrest is capable of being conveniently performed even if the high-back board that is arranged higher than the height of the seatback is mounted on the rear surface portion of the seatback.

Second, since the electric upward and downward driving mechanism for adjusting the upward and downward position of the headrest is mounted inside the high-back board, the upward and downward adjustment of the position of the headrest is capable of being conveniently performed even if the high-back board that is arranged higher than the height of the seatback is mounted on the rear surface portion of the seatback.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF ILLUSTRATIVE EMBODIMENTS

Specific structures and functions stated in the embodiment of the present disclosure are exemplified to illustrate an embodiment according to the spirit of the present disclosure and embodiments according to the spirit of the present disclosure can be achieved in various ways. In addition, the present disclosure should not be construed as being limited to the following embodiments and should be construed as including all changes, equivalents, and replacements included in the spirit and scope of the present disclosure.

In the present disclosure, terms including "first" and/or "second" may be used to describe various components, but the components are not limited to the terms. The terms are used to distinguish one component from another component, and for instance, a first component may be referred to as a second component, and similarly, a second component may be referred to as a first component without departing from the scope according to the spirit of the present disclosure.

In the present disclosure, when a component is referred to as being "connected" or "coupled" to another component, it should be understood that it may be directly connected or coupled to the other component, but other components may exist therebetween. On the other hand, when a component is referred to as being "directly connected" or "directly contacted" to another component, it should be understood that there is no other component therebetween. Expressions for describing relationships between components, that is, "between", "directly between", "adjacent to", and "directly adjacent to" should be construed in the same way.

Like components will be denoted by like reference numerals throughout the specification. Terms used in the specification are used to describe embodiments of the present disclosure and are not intended to limit the scope of the present disclosure. In the specification, the terms of a singular form may include plural forms unless otherwise specified. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, an exemplary embodiment of the present disclosure will be described with reference to accompanying drawings.

Figure 1:
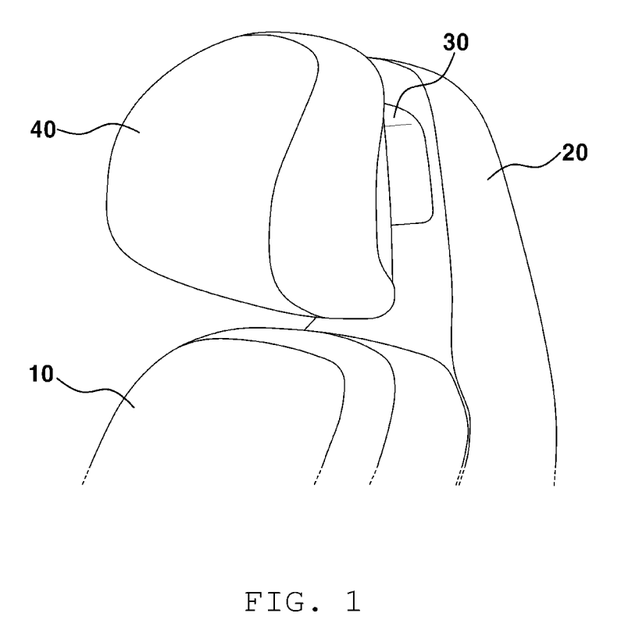
FIG. 1 is a view schematically illustrating a high-back board and a headrest in which a headrest position adjustment apparatus for a vehicle according to the present disclosure is mounted.

Referring to FIG. 1, in configurations of a vehicle seat, a high-back board 20 that is arranged on a rear surface portion of a seatback 10 such that the high-back board 20 is positioned higher than a height of the seatback 10 is mounted for increasing aesthetic appearance and so on, a housing 30 is mounted on a front surface portion of the high-back board 20, and a headrest 40 is mounted on the housing 30 such that the headrest 40 is capable of being slid forward and backward.

In the present disclosure, an electric forward and backward position adjustment apparatus capable of moving the headrest 40 along front and rear directions and an electric height adjustment apparatus capable of moving the headrest 40 along up and down directions are mounted inside the housing 30 and the headrest 40, so that a position of the headrest 40 is capable of being conveniently adjusted from the high-back board 20 along the front and rear directions and the up and down directions.

Figure 2:
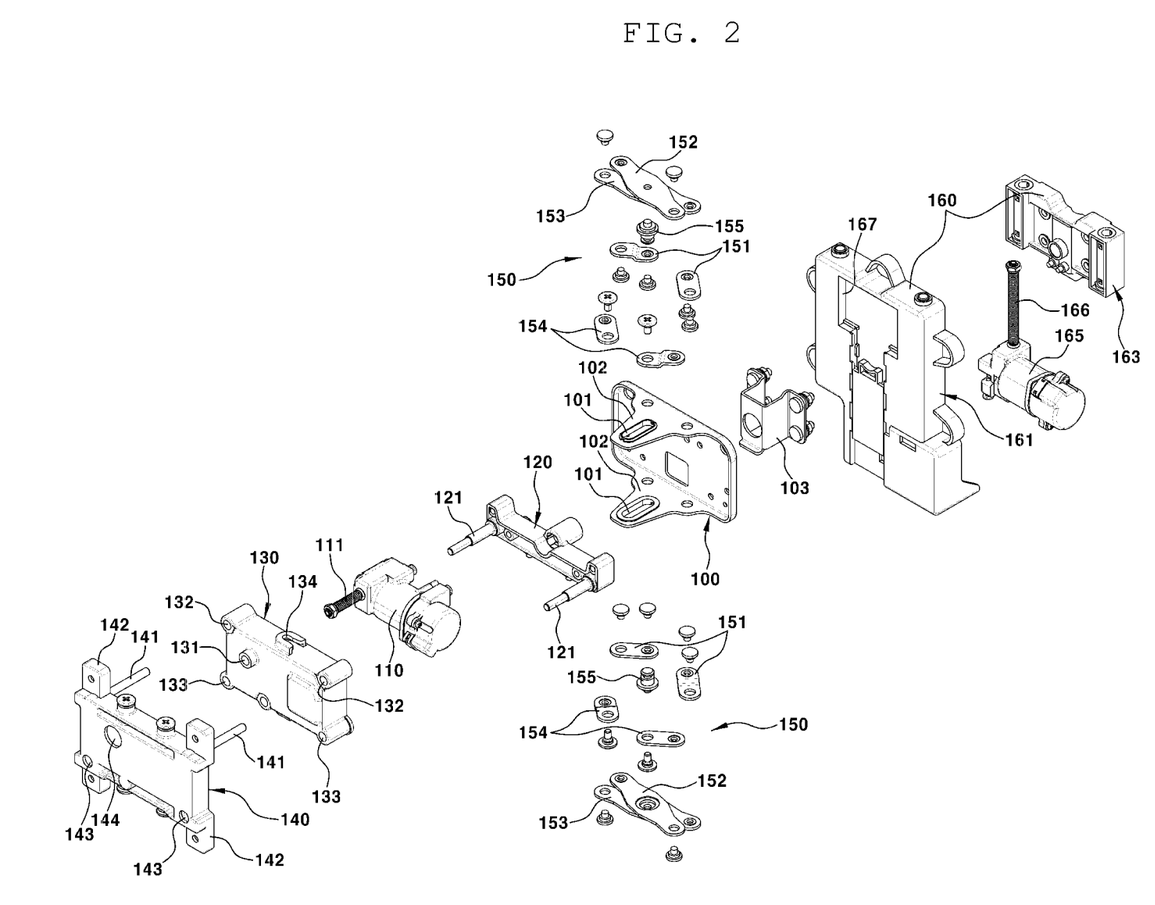
FIG. 2 is an exploded perspective view illustrating the headrest position adjustment apparatus for the vehicle according to the present disclosure.
Figure 3:
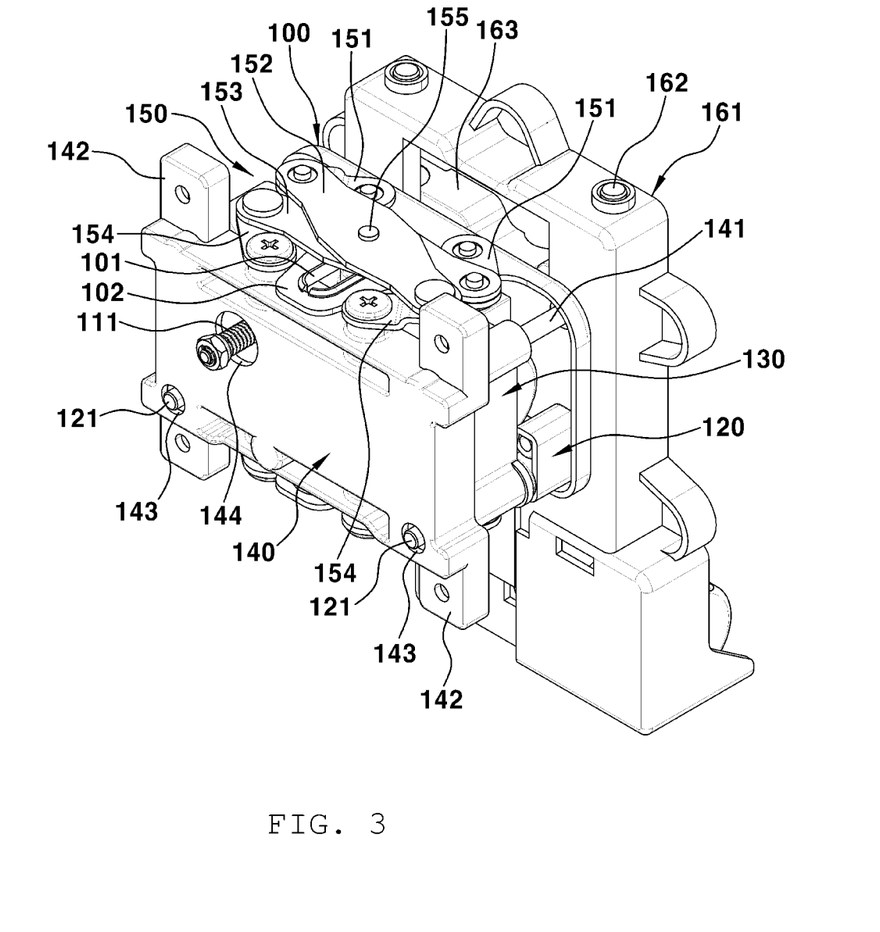
FIG. 3 is an assembled perspective view illustrating the headrest position adjustment apparatus for the vehicle according to the present disclosure.

FIG. 2 is an exploded perspective view illustrating a headrest position adjustment apparatus for a vehicle according to the present disclosure, and FIG. 3 is an assembled perspective view illustrating the headrest position adjustment apparatus for the vehicle according to the present disclosure.

A fixing frame 100 is mounted inside the housing 30 that is mounted on the front surface portion of the high-back board 20.

The fixing frame 100 is a rectangular plate body, and is provided such that a guide plate 102 having a slide hole 101 is formed on an upper end portion and a lower end portion of the fixing frame 100 as an integral part.

In addition, each guide plate 102 protrudes forward on the upper end portion and the lower end portion of the fixing frame 100, and each slide hole 101 formed long in front and rear directions is formed on each guide plate 102.

A first motor 110 having a first lead screw 111 as an output shaft is mounted on a predetermined position on a front surface of the fixing frame 100, and the first lead screw 111 is arranged such that the first lead screw 111 faces forward.

Accordingly, when the first motor 110 is driven, the first lead screw 111 is rotated in place in a first direction or a second direction.

A fixing guide 120 in which a pair of first guide pipes 121 facing forward is formed is mounted on a lower position of the front surface of the fixing frame 100.

In addition, the fixing guide 120 is mounted on the lower position of the front surface of the fixing frame 100, and the first guide pipes 121 that is arranged such that the first guide pipes 121 face forward are mounted on opposite side end portions of the fixing guide 120.

A first slider 130 is fastened to the first lead screw 111 of the first motor 100 and to the first guide pipes 121 of the fixing guide 120 such that the first slider 130 is capable of being moved forward and backward.

To this end, the first slider 130 may have a rectangular body shape, may have an arm screw hole 131 which is formed at a predetermined position in the first slider 130 and into which the first lead screw 111 is inserted such that the first lead screw 111 is capable of being rotated in place, may have upper guide holes 132 formed on an upper position of opposite sides of the first slider 130, and may have lower guide holes 133 which is formed on a lower position of the opposite sides of the first slider 130 and into which the first guide pipes 121 are inserted.

Meanwhile, a second slider 140 is mounted on the headrest 40, and a pair of second guide pipes 141 facing rearward is formed on the second slider 140 such that the second guide pipes 141 are inserted into the upper guide holes 132.

In addition, the second slider 140 may have a rectangular body shape, may have mounting ends 142 mounted on an inner frame (not illustrated) of the headrest 40 are formed integrally with the second slider 140 and are formed on four corner positions of the second slider 140, and the second guide pipes 141 facing backward may be mounted on the second slider 140 such that the second guide pipes 141 are inserted into the upper guide holes 132 of the first slider 130.

Particularly, a link device 150 for pushing the second slider 140 forward or pulling the second slider 140 backward is connected between the fixing frame 100 and the second slider 140.

The link device 150 may include a pair of rear links 151 respectively hinge-mounted on the upper surface portion and the lower surface portion of the guide plates 102 of the fixing frame 100, a pair of front links 154 respectively hinge-mounted on an upper surface portion and a lower surface portion of the second slider 140, a first lever 152 and a second lever 153 having front end portions hinge-fastened to rear end portions of the front links 154 and having rear end portions hinge-fastened to front end portions of the rear links 151 such that the first lever 152 and the second lever 153 are arranged in an "X" shape.

In addition, the link device 150 further includes a guide pin 155. The guide pin 155 is fixed to the upper surface portion of the first slider 130 after the guide pin 155 is inserted into the slide hole 101 of the guide plate 102 from an intersection point of the first lever 152 and the second lever 153 such that the guide pin 155 is capable of being moved forward and backward.

At this time, a fixing groove 134 where a lower end portion of the guide pin 155 is inserted thereinto and fixed thereto is formed on the upper surface portion of the first slider 130, the guide pin 155 passing through the slide hole 101 by being inserted from the intersection point of the first lever 152 and the second lever 153.

Therefore, when the first lead screw 111 is rotated in place in the first direction or the second direction in the arm screw hole 131 of the first slider 130 by driving the first motor 110, the first slider 130 is moved forward or backward along the first guide pipes 121 of the fixing guide 120.

At the same time, when the first slider 130 is moved forward or backward, the guide pin 155 fixed to the fixing groove 134 of the first slider 130 is moved forward or backward along the slide hole 101 of the guide plate 102.

In a situation in which the guide pin 155 is moved forward along the slide hole 101, when the first lever 152 and the second lever 153 perform an expansion rotation forward from the rear link 151 and also push the front link 154, the second slider 140 hinge-fastened to the front link 154 is moved forward.

Meanwhile, in a situation in which the guide pin 155 is moved backward along the slide hole 101, when the first lever 152 and the second lever 153 perform a contraction rotation backward to the rear link 151 and also pull the front link 154, the second slider 140 hinge-fastened to the front link 154 is moved backward.

At this time, since the second guide pipes 141 of the second slider 140 is in a state in which the second guide pipes 141 are inserted into the upper guide holes 132 of the first slider 130 such that the second guide pipes 141 are capable of being slidably moved, a rectilinear movement of the second slider 140 may be guided. Furthermore, since the second slider 140 is in a state in which the second slider 140 is fastened to the inner frame of the headrest 40, a forward and backward position of the headrest 40 may be adjusted when the second slider 140 is moved forward and backward.

Meanwhile, auxiliary guide holes 143 where front end portions of the first guide pipes 121 of the fixing guide 120 pass through the lower guide holes 133 of the first slider 130 and are inserted thereinto are formed on the lower position of the opposite sides of the second slider 140.

Therefore, when the second slider 140 is maximally moved backward, the front end portions of the first guide pipes 121 of the fixing guide 120 passing through the lower guide holes 133 of the first slider 130 are inserted into the auxiliary guide holes 143 of the second slider 140, the first guide pipes 121 is capable of being maintained in a fixed state at the rearmost position without being swayed.

In addition, an interference avoidance hole 144 where the front end portion of the first lead screw 111 of the first motor 110 passes through the arm screw hole 131 of the first slider 130 and are inserted thereinto is formed in a predetermined position of the second slider 140.

Therefore, when the second slider 140 is moved backward, the front end portion of the first lead screw 111 may be positioned in the interference avoidance hole 144 while being in a non-contact state, so that the rectilinear movement of the second slider 140 in the front and rear directions may be performed without any interference.

Meanwhile, a connection bracket 103 for connecting a headrest height adjustment apparatus 160 that is mounted inside the high-back board 20 is mounted on a rear surface portion of the fixing frame 100.

The headrest height adjustment apparatus 160 may include a fixing bracket 161 mounted inside the high-back board 20, a pair of third guide pipes 162 connected between an upper portion and a lower portion of the fixing bracket 161, a lifting plate 163 which is fastened to the connection bracket 103 and which is fastened to the third guide pipes 162 such that the lifting plate 163 is capable of being lifted, and a second motor 165 mounted on a rear surface portion of the fixing bracket 161 so as to lift and drive the lifting plate 163.

In addition, an arm screw body 164 is formed on a rear surface portion of the lifting plate 163, and a second lead screw 166 fastened to the arm screw body 164 such that the second lead screw 177 faces upward is mounted on an output portion of the second motor 165.

Preferably, a lifting guide hole 167 for securing a lifting space of the connection bracket 103 is formed through the fixing bracket 161, so that the connection bracket 103 is capable of being conveniently lifted together with the lifting plate 163 in the lifting guide hole 167 when the lifting plate 163 is lifted.

Here, an operation flow of the headrest position adjustment apparatus of the present disclosure configured as described above is as follows.

Figure 4:
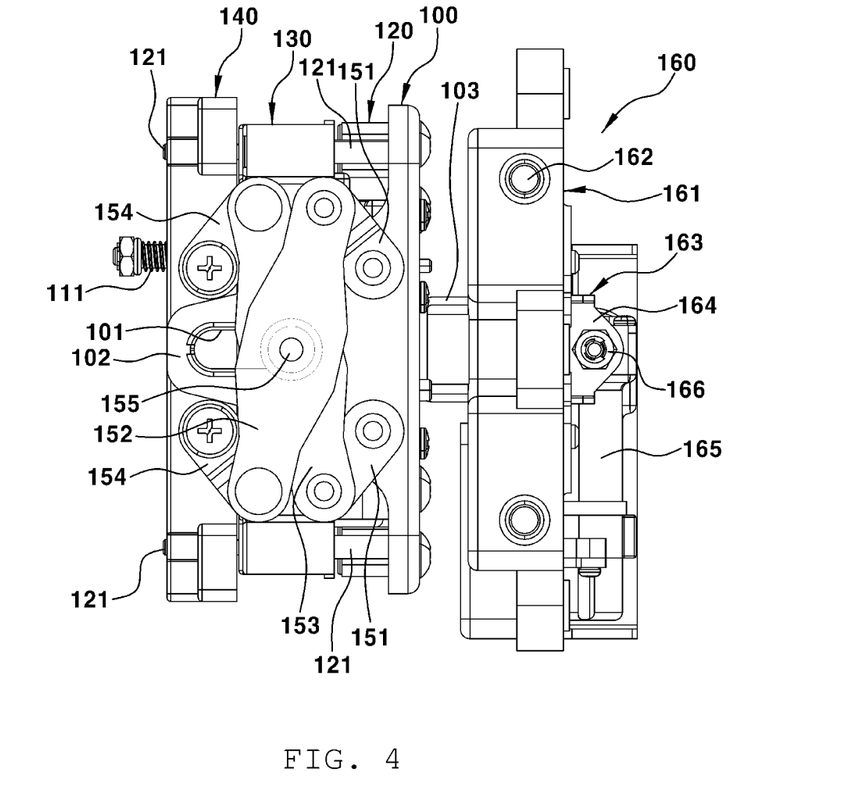
FIG. 4 and FIG. 5 are cross-sectional views illustrating a state in which a headrest is moved backward and is positioned at the rearmost position by the headrest position adjustment apparatus for the vehicle according to the present disclosure.
Figure 5:
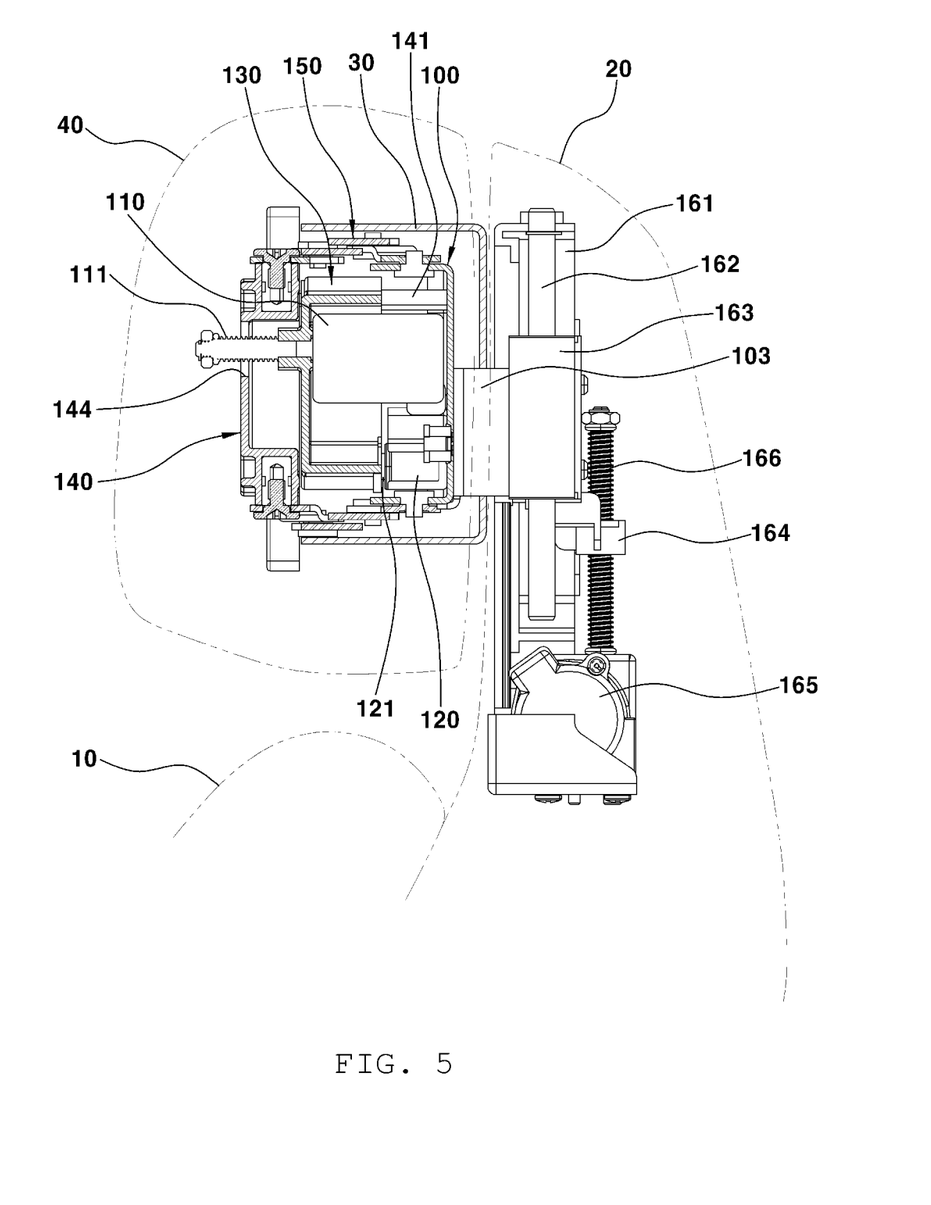
Figure 6:
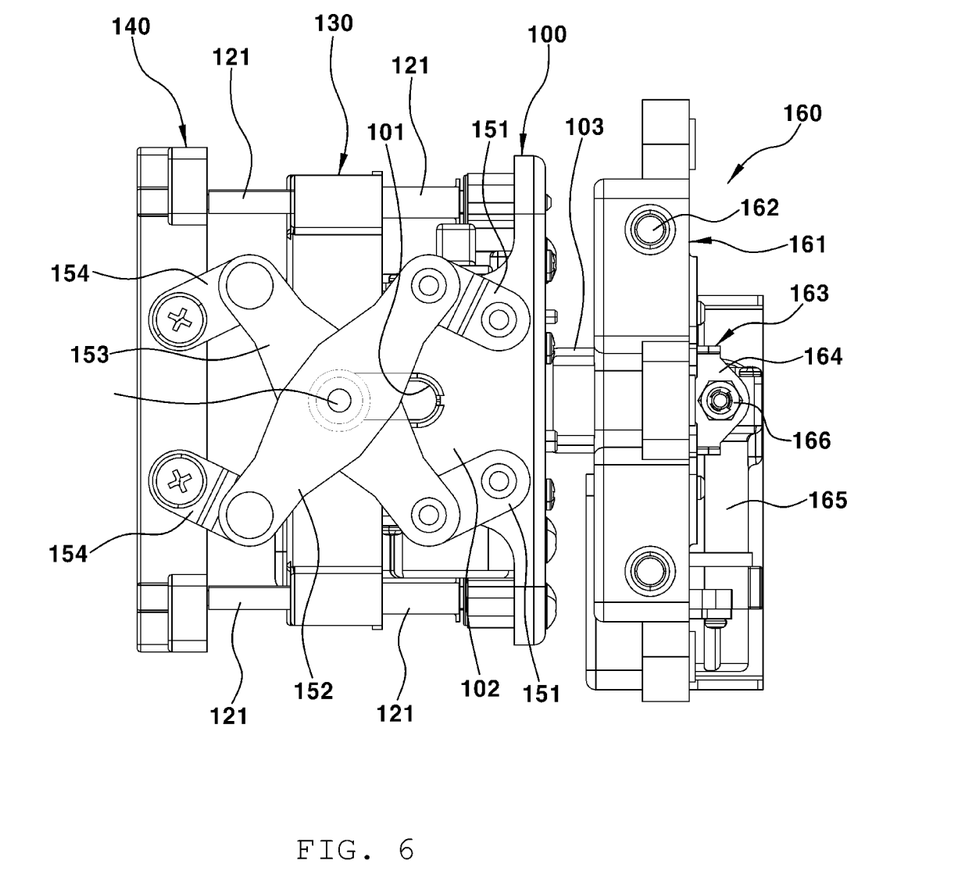
FIG. 6 and FIG. 7 are cross-sectional views illustrating a state in which the headrest is moved forward and is positioned at the frontmost position by the headrest position adjustment apparatus for the vehicle according to the present disclosure.
Figure 7:
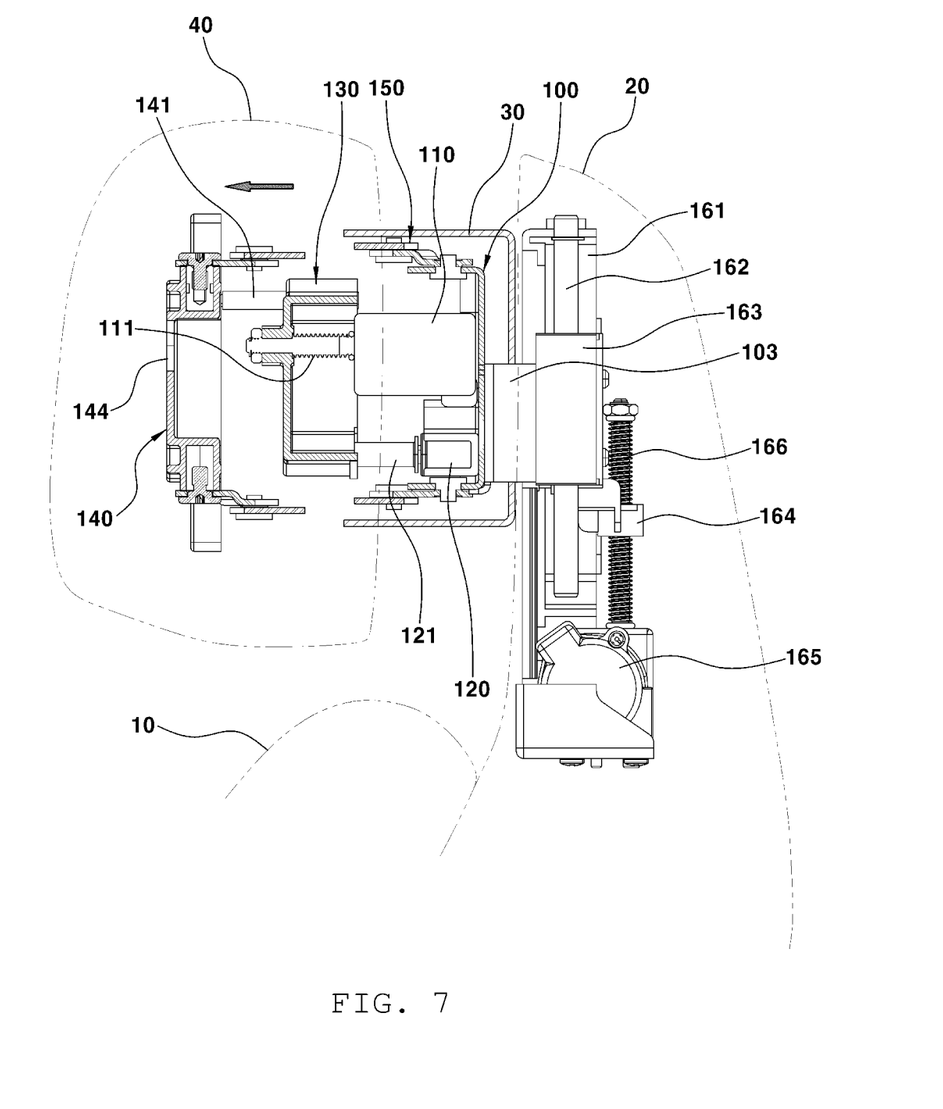

FIG. 4 and FIG. 5 are cross-sectional views illustrating a state in which the headrest is moved backward and is positioned at the rearmost position by the headrest position adjustment apparatus for the vehicle according to the present disclosure, and FIG. 6 and FIG. 7 are cross-sectional views illustrating a state in which the headrest is moved forward and is positioned at the frontmost position by the headrest position adjustment apparatus for the vehicle according to the present disclosure.

Referring to FIG. 4 and FIG. 5, in a state in which the headrest 40 is positioned at the rearmost position, the first slider 130 is in close contact with the front surface portion of the fixing guide 120 that is mounted on the fixing frame 100, and the second slider 140 is in close contact with the front surface portion of the first slider 130.

In addition, in the state in which the headrest 40 is positioned at the rearmost position, as the guide pins 155 are positioned at the rearmost position of the slide holes 101, the first lever 152 and the second lever 153 are maintained in a state in which the contraction rotation of the first lever 152 and the second lever 153 are maximally performed to the rear link 151.

In addition, in the state in which the headrest 40 is positioned at the rearmost position, the first guide pipes 121 of the fixing guide 120 pass through the lower guide holes 133 of the first slider 130, and maintain a state in which the first guide pipes 121 are inserted into the auxiliary guide holes 143 of the second slider 140.

In addition, in the state in which the headrest 40 is positioned at the rearmost position, the second guide pipes 141 of the second slider 140 pass through the upper guide holes 132 of the first slider 130, and maintain a state in which the second guide pipes 141 are in close contact with the front surface portion of the fixing frame 100.

As described above, in the state in which the headrest 40 is positioned at the rearmost position, in order to move the headrest 40 forward, when the first lead screw 111 is rotated in place in the first direction in the arm screw hole 131 of the first slider 130 by driving the first motor 110, the first slider 130 is moved forward along the first guide pipes 121 of the fixing guide 120.

At the same time, when the first slider 130 is moved forward, the guide pins 155 fixed to the fixing grooves 134 of the first slider 130 are moved forward along the slide holes 101 of the guide plate 102.

As such, in a situation in which the guide pins 155 are moved forward along the slide holes 101, as the first lever 152 and the second lever 153 perform the expansion rotation forward from the rear link 151 and also push the front link 154, the second slider 140 hinge-fastened to the front link 154 is moved forward.

At this time, since the first guide pipes 121 of the fixing guide 120 are in a state in which the first guide pipes 121 are inserted into the lower guide holes 133 of the first slider 130, the forward rectilinear movement of the first slider 130 may be guided. Furthermore, since the second guide pipes 141 of the second slider 140 are in a state in which the second guide pipes 141 are inserted into the upper guide holes 132 of the first slider 130 such that the second guide pipes 141 are capable of being slidably moved, the forward rectilinear movement of the second slider 140 may be guided.

Therefore, since the second slider 140 is in a state in which the second slider 140 is fastened to the inner frame of the headrest 40, the headrest 40 is moved forward together with the second slider 140 when the second slider 140 is moved forward, so that the position of the headrest 40 may be moved forward and adjusted.

As described above, when the headrest 40 is moved forward and is in a state in which the headrest 40 is positioned at the frontmost position, the fixing guide 120 mounted on the fixing frame 100, the first slider 130, and the second slider 140 are spaced apart from each other by a predetermined distance as illustrated in FIG. 6 and FIG. 7.

In addition, in the state in which the headrest 40 is positioned at the frontmost position, as the guide pins 155 are positioned at the frontmost position of the slide holes 101, the first lever 152 and the second lever 153 are maintained in a state in which the expansion rotation of the first lever 152 and the second lever 153 are maximally performed from the rear link 151.

As described above, in the state in which the headrest 40 is positioned at the frontmost position, in order to move the headrest 40 backward, when the first lead screw 111 is rotated in place in the second direction in the arm screw hole 131 of the first slider 130 by driving the first motor 110, the first slider 130 is moved backward along the first guide pipes 121 of the fixing guide 120.

At the same time, when the first slider 130 is moved backward, the guide pins 155 fixed to the fixing grooves 134 of the first slider 130 are moved backward along the slide holes 101 of the guide plate 102.

Meanwhile, in a situation in which the guide pins 155 are moved backward along the slide holes 101, as the first lever 152 and the second lever 153 perform the contraction rotation backward to the rear link 151 and also pull the front link 154, the second slider 140 hinge-fastened to the front link 154 is moved backward.

At this time, since the first guide pipes 121 of the fixing guide 120 are in a state in which the first guide pipes 121 are inserted into the lower guide holes 133 of the first slider 130, the backward rectilinear movement of the first slider 130 may be guided. Furthermore, since the second guide pipes 141 of the second slider 140 are in a state in which the second guide pipes 141 are inserted into the upper guide holes 132 of the first slider 130 such that the second guide pipes 141 are capable of being slidably moved, the backward rectilinear movement of the second slider 140 may be guided.

Therefore, since the second slider 140 is in a state in which the second slider 140 is fastened to the inner frame of the headrest 40, the headrest 40 is moved backward together with the second slider 140 when the second slider 140 is moved backward, so that the position of the headrest 40 may be moved backward and adjusted.

As such, even if the high-back board that is arranged such that the high-back board is positioned higher than the height of the seatback is mounted on the rear surface portion of the seatback so as to improve the seat design and to increase the aesthetic appearance of the seat, the forward and backward position adjustment of the headrest may be easily performed.

Figure 8:
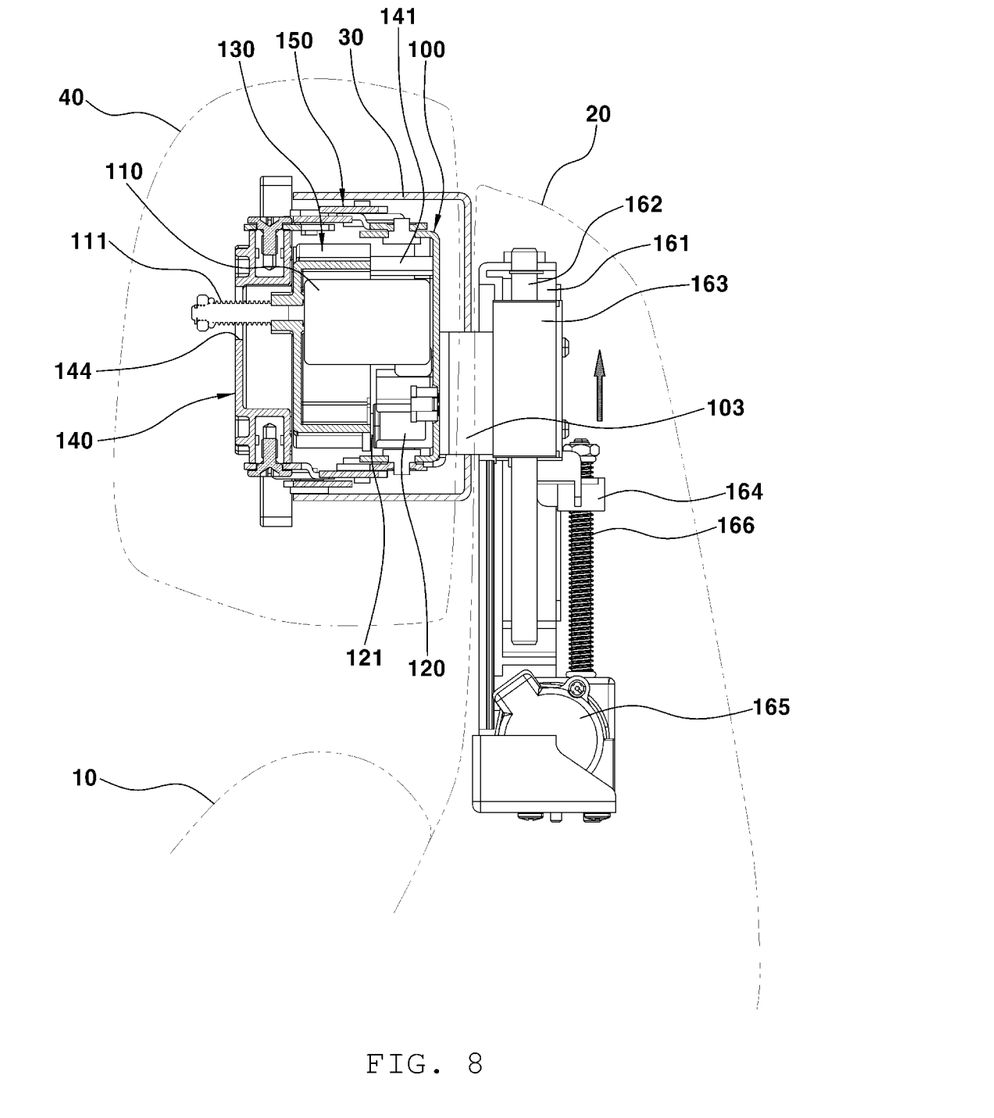
FIG. 8 is a cross-sectional view illustrating a state in which the headrest is positioned at the maximum height by being lifted by the headrest position adjustment apparatus for the vehicle according to the present disclosure.

FIG. 8 is a cross-sectional view illustrating a state in which the headrest is positioned at the maximum height by being lifted by the headrest position adjustment apparatus for the vehicle according to the present disclosure.

According to the present disclosure, the height of the headrest in the up and down directions may be easily adjusted by driving the headrest height adjustment apparatus 160.

To this end, when the second motor 165 is driven first, the second lead screw 166 that is an output shaft of the second motor 165 is rotated in place in the first direction.

Then, as the arm screw body 164 formed on the rear surface portion of the lifting plate 163 is lifted upward along the second lead screw 166, the lifting plate 163 is rectilinearly moved upward.

Of course, when the lifting plate 163 is moved upward, the lifting plate 163 may be rectilinearly moved upward easily by being guided by the pair of third guide pipes 162.

At this time, since the connection bracket 103 is in a state in which the connection bracket 103 is fastened to the lifting plate 163 and the connection bracket 103 is in a state in which the connection bracket 103 is fastened to the fixing bracket 100 inside the housing 30, the connection bracket 103 and the fixing bracket 100 are also capable of being moved upward when the lifting plate 163 is moved upward.

Therefore, when the lifting plate 163 is moved upward, the housing 30 having the fixing bracket 100 mounted therein and the headrest 40 mounted on the housing 30 such that the headrest 40 is capable of being slidably moved in the front and rear directions are moved upward, so that the height adjustment of the headrest 40 is capable of being performed.

Of course, when the second motor 165 is driven and the second lead screw 166 that is the output shaft of the second motor 165 is rotated in place in the second direction, the lifting plate 163 is moved downward, so that the position of the headrest 40 may be moved downward and adjusted.

As such, even if the high-back board that is arranged such that the high-back board is positioned higher than the height of the seatback is mounted on the rear surface portion of the seatback so as to improve the seat design and to increase the aesthetic appearance of the seat, the forward and backward position adjustment and also the vertical position adjustment of the headrest may be easily performed.

Although an embodiment of the present disclosure has been described in detail, the scope of the prevent disclosure is not limited to the embodiment, and various modifications and improvements devised by those skilled in the art using the fundamental concept of the present disclosure, which is defined by the appended claims, may further fall within the scope of the present disclosure.

What is claimed is:

1. A headrest position adjustment apparatus comprising:
    a housing mounted on a front surface portion of a high-back board;
    a headrest mounted on the housing such that the headrest is capable of being slidably moved forward and backward;
    a fixing frame having a guide plate comprising a first slide hole on an upper end portion and a second slide hole on a lower end portion, the fixing frame being mounted inside the housing;
    a first motor mounted on the fixing frame, the first motor having a first lead screw facing forward as an output shaft;
    a fixing guide mounted on the fixing frame, the fixing guide having a pair of first guide pipes facing forward;
    a first slider comprising:
        an arm screw hole into which the first lead screw is inserted such that the first lead screw is capable of being rotated,
        upper guide holes arranged on an upper position on opposite sides of the first slider, and
        lower guide holes arranged on a lower position of the opposite sides of the first slider and into which the first guide pipes are inserted;
    a second slider mounted on the headrest, the second slider having a pair of second guide pipes facing backward such that the second guide pipes are inserted into the upper guide holes; and
    a link device connected between the fixing frame and the second slider, the link device being configured to push the second slider forward or to pull the second slider backward.

2. The headrest position adjustment apparatus of claim 1, wherein the second slider comprises auxiliary guide holes through which front end portions of the first guide pipes of the fixing guide pass, the auxiliary guide holes are arranged on a lower position of opposite sides of the second slider.

3. The headrest position adjustment apparatus of claim 1, wherein the second slider comprises an interference avoidance hole through which a front end portion of the first lead screw of the first motor passes through.

4. The headrest position adjustment apparatus of claim 1, wherein the second slider comprises integrally formed mounting ends configured to be mounted to the headrest, the mounting ends arranged at four corners of the second slider.

5. The headrest position adjustment apparatus of claim 1, wherein the link device comprises:
    a pair of rear links respectively hinge-mounted on an upper surface portion and a lower surface portion of each guide plate of the fixing frame;
    a pair of front links respectively hinge-mounted on an upper surface portion and a lower surface portion of the second slider; and
    a first lever and a second lever having front end portions hinge-fastened to the front links and having rear end portions hinge-fastened to the rear links such that the first lever and the second lever are arranged in an X shape.

6. The headrest position adjustment apparatus of claim 5, wherein the link device further comprises a guide pin inserted into the first slide hole of the guide plate from an intersection point of the first lever and the second lever such that the guide pin is capable of being moved forward and backward, the guide pin is inserted into and fixed to an upper surface portion of the first slider.

7. The headrest position adjustment apparatus of claim 6, wherein a fixing groove where a lower end portion of the guide pin which is inserted from the intersection point of the first lever and the second lever and which passes through the first slide hole is inserted thereinto and fixed thereto is formed on the upper surface portion of the first slider.

8. The headrest position adjustment apparatus of claim 1, further comprising:
a headrest height adjustment apparatus mountable inside the high-back board; and
a connection bracket connected to the headrest height adjustment apparatus,
wherein the high-back board is mountable on a rear surface portion of the fixing frame.

9. The headrest position adjustment apparatus of claim 8, wherein the headrest height adjustment apparatus comprises:
a fixing bracket mountable inside the high-back board,
a pair of third guide pipes connected between an upper portion and a lower portion of the fixing bracket,
a lifting plate fastened to the connection bracket and also fastened to the third guide pipes such that the lifting plate is capable of being lifted, and
a second motor mounted on the rear surface portion of the fixing bracket so as to drive the lifting plate.

10. The headrest position adjustment apparatus of claim 9, wherein an arm screw body is formed on a rear surface portion of the lifting plate, and a second lead screw fastened to the arm screw body is mounted on an output portion of the second motor such that the second lead screw faces upward.

11. The headrest position adjustment apparatus of claim 9, wherein a lifting guide hole for securing a lifting space of the connection bracket is formed through the fixing bracket.

12. A headrest position adjustment apparatus comprising:
a fixing frame having a guide plate comprising a first slide hole on an upper end portion and a second slide hole on a lower end portion, wherein a rear surface portion of the fixing frame is configured to be mounted to a high-back board;
a first motor mounted on the fixing frame, wherein the first motor is configured to move a headrest;
a fixing guide mounted on the fixing frame, wherein the fixing guide has a pair of first guide pipes facing forward;
a first slider comprising:
upper guide holes arranged on an upper position on opposite sides of the first slider, and
lower guide holes arranged on a lower position of the opposite sides of the first slider and into which the first guide pipes are inserted;
a second slider mounted on the headrest, the second slider having a pair of second guide pipes facing backward such that the second guide pipes are inserted into the upper guide holes; and
a link device connected between the fixing frame and the second slider, wherein the link device is configured to push the second slider forward or to pull the second slider backward.

13. The headrest position adjustment apparatus of claim 12, wherein the link device comprises:
a pair of rear links respectively hinge-mounted on an upper surface portion and a lower surface portion of each guide plate of the fixing frame;
a pair of front links respectively hinge-mounted on an upper surface portion and a lower surface portion of the second slider; and
a first lever and a second lever having front end portions hinge-fastened to the front links and having rear end portions hinge-fastened to the rear links such that the first lever and the second lever are arranged in an X shape.

14. The headrest position adjustment apparatus of claim 12, wherein the second slider comprises integrally formed mounting ends configured to be mounted to the headrest, the mounting ends arranged at four corners of the second slider.

15. The headrest position adjustment apparatus of claim 12, further comprising a headrest height adjustment apparatus comprising:
a fixing bracket mountable inside the high-back board, and
a second motor mounted on a rear surface portion of the fixing bracket, the second motor configured to move the headrest.

16. The headrest position adjustment apparatus of claim 12, wherein the link device comprises a plurality of link devices, wherein a first link device is arranged at the upper end portion of the fixing frame, and wherein a second link device is arranged at the lower end portion of the fixing frame.

17. The headrest position adjustment apparatus of claim 16, wherein the plurality of link devices are exactly two link devices.

18. The headrest position adjustment apparatus of claim 16, wherein the plurality of link devices comprises levers, and wherein each lever has a shape of an X.

* * * * *